Jan. 29, 1924.

R. R. BOSTIC 1,481,980

CABLE MEASURING DEVICE

Filed June 26, 1922

INVENTOR
Ralph R. Bostic.
BY
ATTORNEY

Patented Jan. 29, 1924.

1,481,980

UNITED STATES PATENT OFFICE.

RALPH R. BOSTIC, OF KANSAS CITY, MISSOURI.

CABLE-MEASURING DEVICE.

Application filed June 26, 1922. Serial No. 570,915.

*To all whom it may concern:*

Be it known that I, RALPH R. BOSTIC, a citizen of the United States, residing at Kansas City, in the county of Jackson and State of Missouri, have invented certain new and useful Improvements in Cable-Measuring Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a device for measuring cable and it is particularly designed for use in measuring cable for deep wells, such as oil wells, so that the depth of the well can be determined.

By employing my device an accurate record can be kept of the progress of the drilling from day to day or any other suitable intervals and the measuring device can be quickly applied to measure the cable and as quickly released when it is not in use. The device is portable, is light and can be held in the hand of the operator in such a manner that the cable will pass over friction wheels to cause them to rotate and through their rotation, operate a counter or registering mechanism which will indicate the length of the cable.

The novel construction of the invention will be apparent by reference to the following description in connection with the accompanying drawings, in which—

Figure 1:
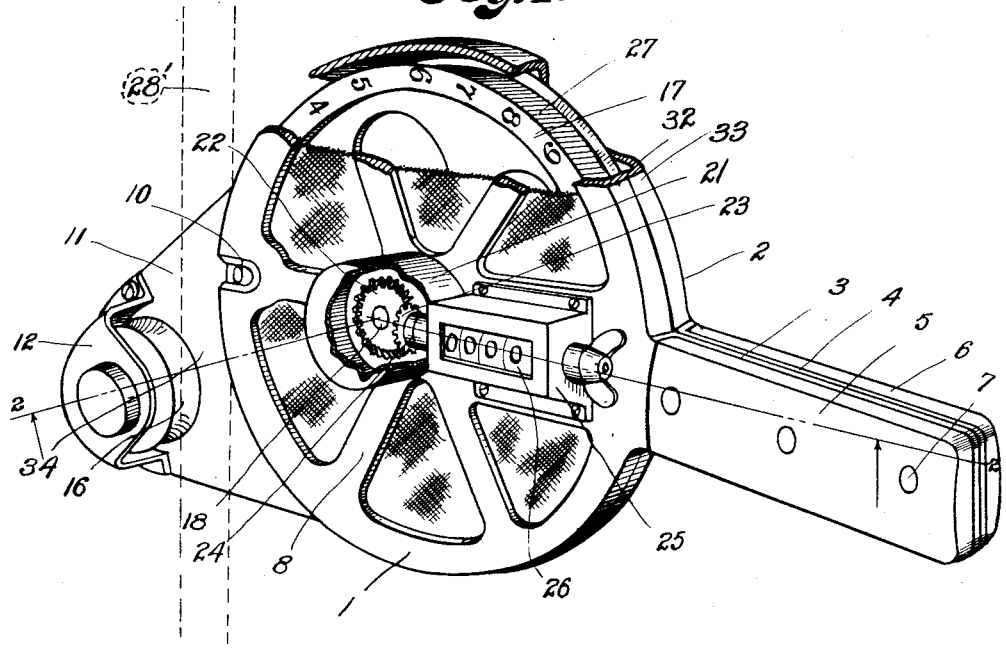
Fig. 1 is a perspective view of a device constructed in accordance with my invention, part of the casing being broken away to better illustrate the friction wheel.
Figure 2:
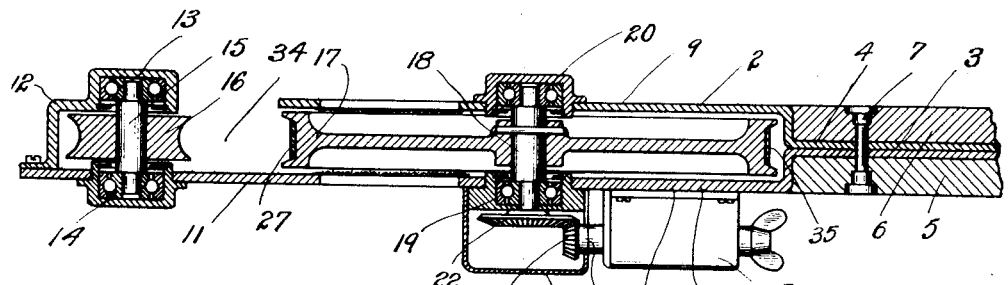
Fig. 2 is a sectional view on the line 2—2 of Fig. 1.
Figure 3:
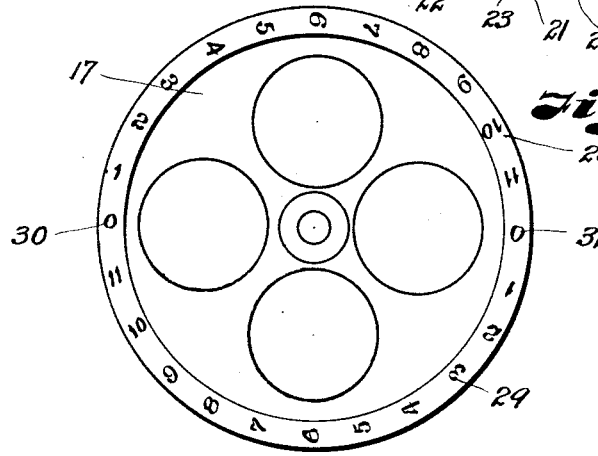
Fig. 3 is a detail perspective view of the friction wheel.

The casing may consist of two members 1 and 2, preferably formed of sheet metal and having rearwardly extensions 3 and 4 to provide a handle. The extensions 3 and 4 may be faced with suitable material such as at 5 and 6 so that the facing material and the two extensions will constitute a four-ply handle fastened by rivets or other suitable fastening devices 7.

The members 1 and 2 are shown as comprising in effect disks having radial spokes or spider arms 8 and 9, the member 1 having a notch 10 by means of which the numbers on the face of the friction wheel may be observed. The member 2 is provided with a forward extension 11, in effect diametrically opposite the handle portion and it carries a bracket 12, in which is a bearing 13, coinciding with a bearing 14 in the extension 11. The bearings 13 and 14 support a shaft 15, upon which is an idler 16 co-operating with a friction wheel 17, which is carried by the shaft 18, mounted in the bearings 19 and 20 supported at the center of the disks 8 and 9. The shaft 18 projects through the bearing 19 and into a gear case 21. On the end of the shaft is a beveled gear 22, which meshes with a pinion gear 23 on a shaft 24 of a counter or register 25 of appropriate construction. The register is fastened to the outside face of the member 1 and it carries register wheels 26, arranged in the usual manner to count up to four digits or 9000 feet.

The friction wheel 17 is grooved, as at 27, the groove being opposite the groove on the idler 16 so that the cable 28', shown in dotted lines, can be received between them. The side face of the wheel 17 is provided with two sets 28 and 29 of numbers, from 1 to 11, the two sets being separated by diametrically oppositely located zeros 30 and 31.

The members 1 and 2 are provided with segmental flanges 32 and 33, having meeting edges so as to constitute a guard to prevent the sand, oil and water from running up over the top of the casing and over the hand of the operator.

The idler 16 and the wheel 17 are spaced apart to provide a space 34, to receive the cable; that is, in using the device, it may be moved laterally so that the cable is received between the grooved idler 16 and the grooved wheel 17. The width of the space is greater than the diameter of the cable so in order to cause the cable to operate the friction wheel 17, it will be necessary to slightly tilt the measuring device so that a line drawn midway between the idler and the friction wheel will be at an angle to the perpendicular. In other words, if the device is applied to the cable as shown in Fig. 1 and then the handle is tilted slightly, the idler and the friction wheel will be frictionally rotated by the cable.

The circumference of the friction wheel 17 may be whatever desired but it is shown as two feet; the sets 28 and 29 of numbers will be inches, the zeros representing feet. When the cable is wound or unwound to contact with the idler and wheel, each half revolution of the wheel will cause a unit, one foot, to register on the indicator or register 25. A complete revolution of the wheel will cause two foot units to register. Anything less than one-half revolution of the wheel 17 will be indicated at the notch 10; that is, any length of cable less than one foot will be registered in inches at the notch 10. Therefore, an accurate measurement of the cable can be provided.

The wheel 17 may be provided with a friction band 35 about its periphery, lying in the groove 27. The friction band may be of any suitable material adapted to induce frictional contact with the cable to prevent slipping.

What I claim and desire to secure by Letters-Patent is:

1. A cable measuring device for wells comprising a casing consisting of two complementary side members, each having an outwardly projecting handle portion, one of the side members having a forward extension, means connecting the handle portions together, a friction wheel mounted between the two side members, an idler mounted upon the forward extension in spaced relation with the friction wheel, and registering mechanism operated by the friction wheel.

2. A cable measuring device for wells comprising a casing having two complementary side members, each side member consisting of a plate having an inwardly offset handle portion, means for securing the handle portions together to maintain the plates in spaced relation, a forward extension on one of the plates, a friction wheel mounted between the plates, an idler mounted upon the forward extension, and a registering mechanism operated by the friction wheel.

3. A cable measuring device for wells comprising two side plates secured together in spaced relation, an integral forward extension on one of the side plates, a friction wheel mounted between the side plates, an idler mounted on the forward extension, and a registering mechanism operated by the friction wheel.

In testimony whereof I affix my signature.

RALPH R. BOSTIC.